United States Patent [19]
Vezzoli et al.

[11] Patent Number: 5,364,254
[45] Date of Patent: Nov. 15, 1994

[54] DIE FOR MANUFACTURING CO-EXTRUDED STRUCTURAL SHAPES

[75] Inventors: Annibale Vezzoli, Carugo; Marino Lamperti, Carugate; Antonio Addeo, Novara; Francesco Milani; Bruno Albrisi, both of Lonate Pozzolo, all of Italy

[73] Assignees: Centro Sviluppo Settori Impiego S.r.l.; Milani Resine S.p.A., both of Milano, Italy

[21] Appl. No.: 203,508

[22] Filed: Feb. 28, 1994

Related U.S. Application Data

[63] Continuation of Ser. No. 981,825, Nov. 25, 1992, abandoned.

[30] Foreign Application Priority Data

Nov. 28, 1991 [IT] Italy .................. MI91A003194

[51] Int. Cl.5 .......................................... B29C 47/06
[52] U.S. Cl. .................. 425/133.1; 264/173; 264/209.8; 264/515; 425/207
[58] Field of Search ............ 425/133.1, 97, 206, 425/382.4, 207; 264/173, 209.8, 514, 515

[56] References Cited

U.S. PATENT DOCUMENTS

| | | | |
|---|---|---|---|
| 3,308,508 | 3/1967 | Schrenk | 425/133.1 |
| 3,365,750 | 1/1968 | Donald | 425/133.1 |
| 3,649,143 | 3/1972 | Popesh et al. | 425/133.1 |
| 4,047,868 | 9/1977 | Kudo et al. | 425/133.1 |
| 4,134,952 | 1/1979 | Yoshikawa et al. | 425/133.1 |
| 4,167,383 | 9/1979 | Murakami et al. | 425/133.1 |
| 4,182,603 | 1/1980 | Knihel | 425/133.1 |
| 4,185,954 | 1/1980 | Murakami et al. | 425/133.1 |
| 4,298,325 | 11/1981 | Cole | 425/133.1 |
| 4,364,882 | 12/1982 | Doucet | 425/133.1 |
| 5,064,364 | 11/1991 | Muller-Erwig | 425/114 |
| 5,069,612 | 12/1991 | Teutsch et al. | 425/133.1 |

FOREIGN PATENT DOCUMENTS

| | | |
|---|---|---|
| 0019564 | 11/1980 | European Pat. Off. . |
| 0400281A2 | 12/1990 | European Pat. Off. . |
| 1348485 | 11/1962 | France . |
| 2306819 | 11/1976 | France . |
| 2910149 | 9/1980 | Germany . |
| 3542241A1 | 6/1986 | Germany . |

Primary Examiner—Jay H. Woo
Assistant Examiner—Joseph Leyson
Attorney, Agent, or Firm—David M. Klein; Bryan Cave

[57] ABSTRACT

A die for co-extruding structural shapes is provided with a central cylindrical duct through which the molten polymeric material destined to constitute the central core of the structural shape flows, and a conical gap, coaxial with the central duct, into which the polymeric coating material is fed which will constitute the outer skin of the structural shape.

4 Claims, 1 Drawing Sheet

DIE FOR MANUFACTURING CO-EXTRUDED STRUCTURAL SHAPES

This is a continuation of U.S. application Ser. No. 07/981,825, filed Nov. 25, 1992 now abandoned.

BACKGROUND OF THE INVENTION

1. Field of the Invention

The present invention relates to a die for producing co-extruded structural shapes, in which a core constituted by a mixture of polymeric materials, in particular of recycled polymeric materials, is provided with a polymeric coating (skin), said die comprising a central body with an internal duct destined to convey the molten material destined to constituting the core of the structural shape.

2. Description of the Prior Art

Dies used for producing co-extruded structural shapes constituted by a plurality of material, which may also be of different hardness and/or color, have been known for a long time in the sector. The operating way of said dies is based on the use of thermoplastic polymeric materials having well-defined rheological characteristics. When such characteristics vary, in particular with varying viscosity and average molecular weight values of the molten mass, the equilibria of correct advancement and distribution of the molten mass are compromised and the die results to be no longer suitable for the intended purpose.

Therefore, it is clear that the traditional technique used to design the co-extrusion dies cannot be transferred to the design of dies used to extrude mixtures of thermoplastic polymers derived from the differentiated collection (recycle) of wastes, from processing scraps, and so forth. The presence of various polymeric matrices chemically incompatible with one another leads to phase separations during molten material flowing through the extrusion head. In the attempts performed in the past and aiming at coating, by a co-extrusion technique, an extruded structural shape based on a heterogeneous mixture of thermoplastic polymers, with a protective and aesthetical skin based on a specific polymeric material, it was observed that, instead of uniformly distributing on the surface of an extruded structural shape, said skin material penetrates the boundary regions between different phases of the polymeric matrix, leading to articles of manufacture characterized by strong unevennesses in the distribution of the polymeric material which constitutes the sheltering skin.

SUMMARY OF THE INVENTION

The purpose of the present invention is of providing a co-extrusion die or head for structural shape manufacturing, which does not display the above said problem, and is easy and simple to be manufactured.

According to the present invention, said purpose is achieved by providing a die which comprises an auxiliary body mounted on a corresponding end of the above said main body, so as to define a gap through which the polymeric coating material is destined to flow, in order to be conveyed onto the surface of the core of the structural shape, with the inner duct of the main body showing a cylindrical tubular configuration.

The absence of conicalness of the inner duct of the main body, commonly designated "parallel portion" of the die, makes possible the advancement rate of the primary molten mass—i.e., of the core material destined to receive, on its outer surface, the co-extruded material—to be kept adequately constant.

Preferably, the above said gap displays a plurality of shaped ring-like chambers substantially coaxial with the inner duct provided through the main body and smoothly joined to one another at annular passage openings through which the molten material flows.

Thanks to such a feature, a natural pre-distribution of the molten coating polymer (sheltering skin) can be obtained.

Preferably, the end of the main body of the die shows a substantially conical shape and is provided with an outer surface having an undulated longitudinal outline which, together with the corresponding inner surface of the auxiliary body, defines the above said ring-like shaped chambers.

Further advantages and characteristics of a die according to the present invention will be evident from the following disclosure in detail made, for merely exemplifying, non-limitative purposes, by referring to the accompanying drawings, in which:

DESCRIPTION OF THE PREFERRED EMBODIMENT

Figure 1:
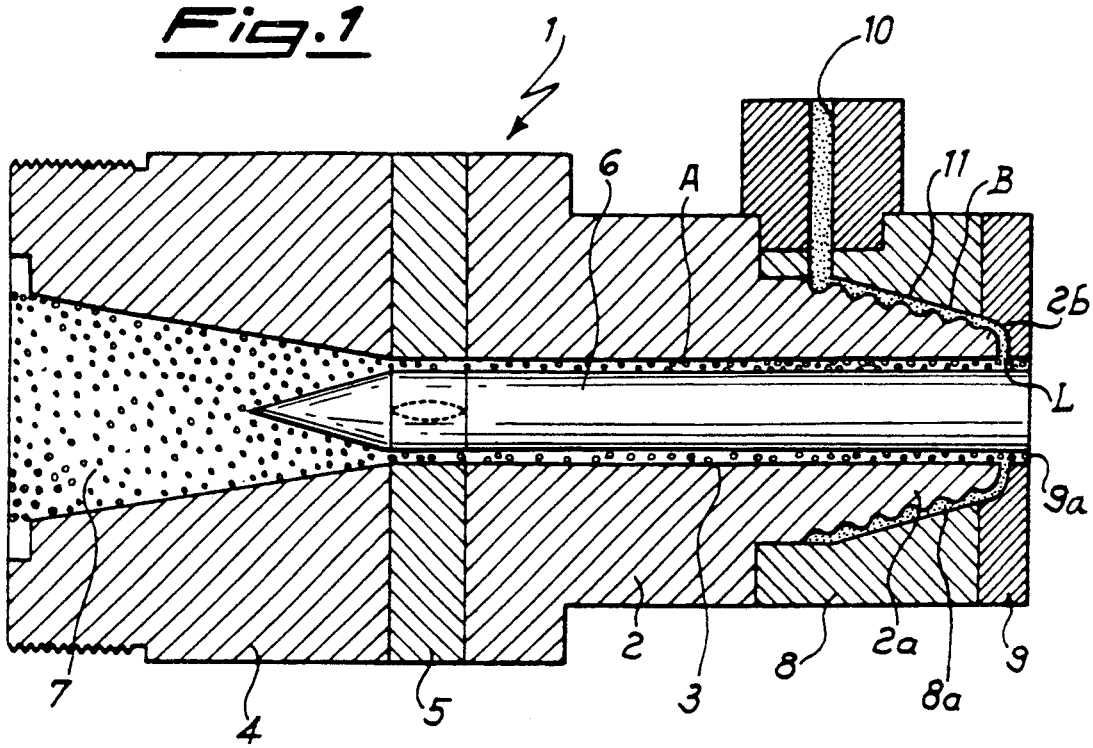
FIG. 1 shows a longitudinal sectional view of a die according to the invention.
Figure 2:
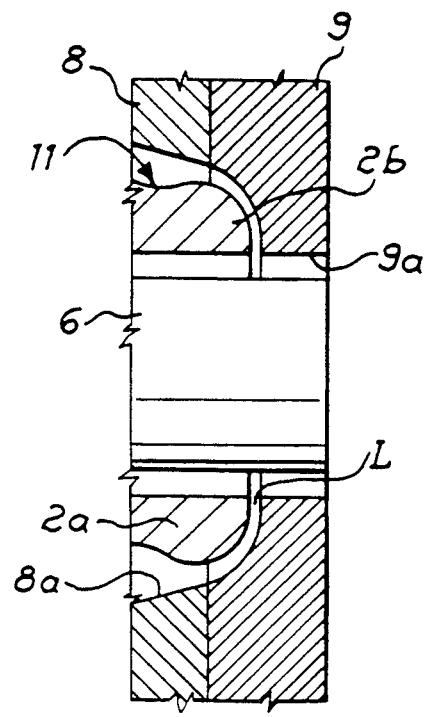
FIG. 2 shows a detail depicted on a larger scale than FIG. 1.

Referring to the drawings, with 1 a co-extrusion die or head for hollow structural shapes is generally indicated. The die 1 comprises a main body 2 having a central through bore 3 and installed on the end of an extruder (not illustrated in the drawings), with the interposition of a linking head 4 and of a crosspiece 5 to which a nozzle 6 coaxial with the central bore 3 of the body 2 and defining the inner cross-section of the die, is centrally fastened. Between said inner cross-section and the wall of the central bore 3, a duct "A" is hence defined, through which the molten polymeric material flows which is fed to 7 by the extruder, and which will form the core of the co-extruded structural shape.

The duct "A" is not tapered, and the ratio of its length to its radial size (i.e., thickness of the gap) should be not lower than 20, and preferably not lower than 40.

The body 2 of the die 1 is provided with an end piece 2a, opposite to the linking head 4, having a substantially cone-frustum shape and on which an auxiliary body 8, substantially ring-shaped, and with an inner conical wall 8a, is mounted. Opposite to the auxiliary body 8 an equalizer plate 9 is mounted, through which a through bore 9a is centrally provided, and is suitable for defining, together with a front portion 2b of the end piece 2a of the main body 2, an annular passage opening "L" through which the polymeric coating material is destined to flow.

Of course, in the case of open structural shapes, and/or in the case in which only a partial coating of the outer surface of the structural shape is desired, the passage opening "L" can be partially closed to a variable extent.

The polymeric coating material is fed to the die 1 by a second extruder (not shown in the drawings), through a duct 10 leading to a gap "B" defined between the end piece 2a of the body 2, and the ring-shaped auxiliary body 8. The gap "B" shows a plurality of ring-like chambers defined by the surface 11 of the end piece 2a, which surface has an undulated longitudinal outline with a sinusoid-like shape. The ring-like chambers, co-axial with the central cylindrical duct "A", are smoothly joined to each other at annular passage openings defined by the crests of the undulations of the surface 11, and the inner wall of the auxiliary body 8. Such annular passage openings have a height which preferably is comprised within the range of from 0.5 to 5 mm, and the bending radius (of the crest and of the valleys) of the undulated longitudinal outline of the surface 11 is preferably comprised within the range of from 3 to 15 mm. Furthermore, the above said undulated longitudinal outline has "wave heights"(i.e., differences in level between valleys and crests) which progressively decrease towards the front portion 2b, i.e., in the direction of advancement of the polymeric coating material.

The end equalizer plate 9, which performs the task of regularizing the flow of the polymeric coating polymer, by distributing the latter in the desired amounts and to the desired zones, can be changed as a function of the types of extruded materials, so as to vary the shape and/or height of the passage opening "L"—which should preferably have a height comprised within the range of from 0.2 to 3 mm.

We claim:

1. A die for producing co-extruded structural shapes, the structural shapes comprising a hollow core comprising a mixture of polymeric materials, and a polymeric coating; the die comprising:
   (a) a main body for receiving a molten flow of the mixture of polymeric materials and for forming the hollow core, the main body comprising:
      (i) an interior cylindrical wall defining a cylindrical aperture extending through the main body along a longitudinal axis of the main body, the cylindrical aperture having a radius,
      (ii) a nozzle disposed in the aperture along the longitudinal axis of the main body, the nozzle comprising an exterior cylindrical surface concentric with the longitudinal axis, the nozzle exterior cylindrical surface having a radius less than the radius of the cylindrical aperture;
      (iii) a cylindrical internal duct defined between the interior cylindrical wall of the aperture and the exterior cylindrical surface of the nozzle, the cylindrical internal duct having a fixed cross-section throughout its entire length, the cylindrical internal duct having an input end for receiving the molten flow of the mixture of polymeric materials and an output end, and
      (iv) an exterior generally conical surface tapering inwardly toward the output end and concentric with the longitudinal axis of the main body, the exterior generally conical surface having an undulated longitudinal outline with a sinusoidal shape;
   (b) an auxiliary body mounted to the main body exterior surface, the auxiliary body comprising a conical interior face sized and shaped to receive a first portion of the generally conical exterior surface of the main body, a second portion of the main body exterior surface adjacent to the output end remaining exposed, the auxiliary body conical interior face cooperating with the generally conical exterior surface of the main body to define a generally conical gap, whereby the generally conical gap comprises a plurality of parallel ring chambers defined between the exterior generally conical surface of the main body and the interior face of the auxiliary body, the generally conical gap having an input end for receiving a flow of the polymeric coating, whereby the polymeric coating may be communicated between successive chambers by annular passage openings defined between crests of the sinusoidal shape of the main body exterior surface and the interior face of the auxiliary body to an output end of the gap; and
   (c) an end-plate mounted adjacent to the output end of the cylindrical internal duct and of the gap and having an aperture aligned with the main body aperture, the end plate comprising a passage forming surface shaped to correspond to the shape of the second portion of the exterior surface of the main body between the output end of the gap and the output end of the cylindrical internal duct, the passage forming surface spaced from and cooperating with the second portion for forming a passage between the output end of the gap and the output end of the cylindrical internal duct for depositing the polymeric coating on the mixture of polymeric material, the main body nozzle extending through the end-plate aperture.

2. A die according to claim 1 wherein the annular passage openings are between 0.5 and 5 mm.

3. A die according to claim 1 wherein the passage is within the range of 0.2 mm to 3 mm wide adjacent the output end of the cylindrical internal duct.

4. A die according to claim 2 wherein a ratio of the length of the cylindrical internal duct of fixed cross-section to the width of the duct is at least 40.

* * * * *